United States Patent
Roh et al.

(10) Patent No.: US 9,496,542 B2
(45) Date of Patent: Nov. 15, 2016

(54) BATTERY MODULE OF IMPROVED RELIABILITY AND BATTERY PACK EMPLOYED WITH THE SAME

(71) Applicant: LG CHEM, LTD., Seoul (KR)

(72) Inventors: Taehwan Roh, Daejeon (KR); Junseok Choi, Daejeon (KR);
(Continued)

(73) Assignee: LG CHEM, LTD., Seoul (KR)

(*) Notice: Subject to any disclaimer, the term of this patent is extended or adjusted under 35 U.S.C. 154(b) by 0 days.

(21) Appl. No.: 14/152,169

(22) Filed: Jan. 10, 2014

(65) Prior Publication Data

US 2014/0127550 A1    May 8, 2014

Related U.S. Application Data

(63) Continuation of application No. PCT/KR2012/005320, filed on Jul. 5, 2012.

(30) Foreign Application Priority Data

Jul. 25, 2011   (KR) ................. 10-2011-0073495

(51) Int. Cl.
*H01M 2/34*      (2006.01)
*H01M 2/02*      (2006.01)
(Continued)

(52) U.S. Cl.
CPC ............. *H01M 2/30* (2013.01); *H01M 2/0245* (2013.01); *H01M 2/1077* (2013.01);
(Continued)

(58) Field of Classification Search
CPC .................................................. H01M 2/347
See application file for complete search history.

(56) References Cited

U.S. PATENT DOCUMENTS

2007/0087266 A1* 4/2007 Bourke et al. ............... 429/159
2009/0169990 A1* 7/2009 Gardner et al. .............. 429/179
(Continued)

FOREIGN PATENT DOCUMENTS

CN      201438492 U    4/2010
EP      1 523 051 A2   4/2005
(Continued)

OTHER PUBLICATIONS

Machine translation for Kim et al., KR 2008-107047 A.*
(Continued)

*Primary Examiner* — Maria J Laios
(74) *Attorney, Agent, or Firm* — Birch, Stewart, Kolasch & Birch, LLP

(57) ABSTRACT

Disclosed is a battery module including a plurality of plate-shaped battery cells which are sequentially stacked, wherein the battery module is configured to have a structure in which two or more hexahedral cell units are connected to each other in series in a state in which the hexahedral cell units are stacked, each of the cell units is configured to have a structure in which two or more battery cells are connected to each other in series in a state in which the battery cells are in tight contact with each other, and electrode terminals (outermost electrode terminals) of outmost battery cells of the cell units are connected to external input and output terminals of the battery module, the outermost electrode terminals having a larger vertical sectional area than electrode terminals of the other battery cells such that the outermost electrode terminals are prevented from being broken by external force.

15 Claims, 7 Drawing Sheets

(72) Inventors: Min Chul Jang, Daejeon (KR); In Cur Shin, Daejeon (KR); Jin Kyu Lee, Daejeon (KR); Dalmo Kang, Daejeon (KR); Yojin Kim, Daejeon (KR); Seongtae Kim, Incheon (KR); Taehyuck Kim, Daejeon (KR)

(51) Int. Cl.
  *H01M 2/30* (2006.01)
  *H01M 2/10* (2006.01)
  *H01M 6/46* (2006.01)
  *H01M 2/20* (2006.01)
  *H01M 4/66* (2006.01)

(52) U.S. Cl.
  CPC ............ *H01M 2/305* (2013.01); *H01M 2/347* (2013.01); *H01M 6/46* (2013.01); *H01M 2/024* (2013.01); *H01M 2/206* (2013.01); *H01M 4/661* (2013.01); *H01M 4/667* (2013.01); *H01M 2220/20* (2013.01)

(56) References Cited

U.S. PATENT DOCUMENTS

2009/0220853 A1* 9/2009 Yang et al. .................. 429/159
2009/0305126 A1 12/2009 Choi et al.
2012/0189890 A1* 7/2012 Mitsuda et al. ............... 429/94

FOREIGN PATENT DOCUMENTS

| JP | 2000-215878 A | | 8/2000 | |
|---|---|---|---|---|
| JP | 2001-167752 A | | 6/2001 | |
| JP | 2003-338269 A | | 11/2003 | |
| JP | 2005-149882 A | | 6/2005 | |
| JP | 2005149882 A | * | 6/2005 | ............ H01M 2/30 |
| JP | 2005-317315 A | | 11/2005 | |
| JP | 2007-165164 A | | 6/2007 | |
| KR | 10-2007-0106814 A | | 11/2007 | |
| KR | 10-2008-0107047 A | | 12/2008 | |
| KR | 2008107047 A | * | 12/2008 | ............ H01M 10/04 |
| KR | 10-2009-0000292 A | | 1/2009 | |
| WO | WO 2007/102672 A1 | | 9/2007 | |

OTHER PUBLICATIONS

Machine translation for Takeda et al., JP 2005-149882 A.*
International Search Report, issued in PCT/KR2012/005320, dated Oct. 31, 2012.
Chinese Office Action with English translation dated Aug. 4, 2015.

* cited by examiner

BATTERY MODULE OF IMPROVED RELIABILITY AND BATTERY PACK EMPLOYED WITH THE SAME

CROSS REFERENCE TO RELATED APPLICATONS

This application is a Continuation of PCT International Application No. PCT/KR2012/005320 filed on Jul. 5, 2012, which claims priority under 35 U.S.C. §119(a) to Patent Application No. 10-2011-0073495 filed in the Republic of Korea on Jul. 25, 2011, all of which are hereby expressly incorporated by reference into the present application.

TECHNICAL FIELD

The present invention relates to a battery module including a plurality of plate-shaped battery cells which are sequentially stacked, wherein the battery module is configured to have a structure in which two or more hexahedral cell units are connected to each other in series in a state in which the hexahedral cell units are stacked, each of the cell units is configured to have a structure in which two or more battery cells are connected to each other in series in a state in which the battery cells are in tight contact with each other, and electrode terminals (outermost electrode terminals) of outmost battery cells of the cell units are connected to external input and output terminals of the battery module, the outermost electrode terminals having a larger vertical sectional area than electrode terminals of the other battery cells such that the outermost electrode terminals are prevented from being broken by external force.

BACKGROUND ART

A secondary battery, which can be charged and discharged, has been widely used as an energy source for wireless mobile devices. In addition, the secondary battery has attracted considerable attention as a power source for devices which require high output and large capacity, such as electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Such devices use a middle or large-sized battery module having a plurality of battery cells electrically connected to each other to provide high output and large capacity.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell (unit battery) of the middle or large-sized battery module. In particular, much interest is currently focused on the pouch-shaped battery, which uses an aluminum laminate sheet as a sheathing member, because the pouch-shaped battery is lightweight, the manufacturing cost of the pouch-shaped battery is low, and it is easy to modify the shape of the pouch-shaped battery.

Meanwhile, electrode terminals of battery cells constituting a battery module mounted in a battery pack for vehicles at the present time have the same size in the battery pack.

In addition, each of the electrode terminals is generally formed of a foil having a thickness of 0.5 mm or less. In a case in which vibration and impact are continuously applied to the battery pack the battery pack is mounted in a vehicle, therefore, the electrode terminals may be broken.

Particularly, a cathode terminal, which is formed of aluminum, exhibits lower strength than an anode terminal, which is formed of copper, in terms of materials. As a result, the cathode terminal exhibits low resistance to external impact and vibration.

In addition, bus bars are fixed to the battery module. In a case in which vibration is applied to the battery module with the result that relative motion occurs between the battery cells and the battery module, therefore, the electrode terminals connected between the bus bars and the corresponding battery cells are structurally weaker than the electrode terminals connected between the respective battery cells.

Furthermore, connection between the respective electrode terminals or between the electrode terminals and the bas bars is generally achieved by laser welding or ultrasonic welding, which is proper for mass production. When the thickness of each of the electrode terminals is increased, however, an amount of energy necessary for welding is increased and, in addition, a defect rate is increased.

Consequently, there is a high necessity for a battery module that is capable of preventing electrode terminals of battery cells from being internally short circuited or broken due to external impact while providing high output and large capacity.

DISCLOSURE

Technical Problem

Therefore, the present invention has been made to solve the above problems and other technical problems that have yet to be resolved.

It is an object of the present invention to provide a battery module configured to have a structure in which electrode terminals of the outermost battery cells of cell units have a larger vertical sectional area than electrode terminals of the other battery cells, thereby securing connection reliability between electrode leads even when external force, such as impact or vibration, is applied to the battery module.

It is another object of the present invention to provide a middle or large-sized battery pack of high output and large capacity including a cell unit and a battery module that is capable of minimizing weight and size of the battery pack while effectively reinforcing low mechanical rigidity of battery cells.

Technical Solution

In accordance with one aspect of the present invention, the above and other objects can be accomplished by the provision of a battery module including a plurality of plate-shaped battery cells which are sequentially stacked, wherein the battery module is configured to have a structure in which two or more hexahedral cell units are connected to each other in series in a state in which the hexahedral cell units are stacked, each of the cell units is configured to have a structure in which two or more battery cells are connected to each other in series in a state in which the battery cells are in tight contact with each other, and electrode terminals (outermost electrode terminals) of outmost battery cells of the cell units are connected to external input and output terminals of the battery module, the outermost electrode terminals having a larger vertical sectional area than electrode terminals of the other battery cells such that the outermost electrode terminals are prevented from being broken by external force.

In the battery module according to the present invention, the outermost electrode terminals connected to the external input and output terminals, among the electrode terminals of the battery cells, have a larger vertical sectional area than the electrode terminals of the other battery cells. Consequently, the outermost electrode terminals are prevented from being broken by external impact or vibration, thereby greatly improving reliability and safety of the battery module. In addition, the electrode terminals of the other battery cells excluding the outermost electrode terminals have a smaller vertical sectional area than the outermost electrode terminals. Consequently, it is possible to achieve easy welding, thereby achieving easy manufacture.

The vertical sectional area of the outermost electrode terminals may be, for example, 110% to 500% that of the electrode terminals of the other battery cells.

In a preferred example, the outermost electrode terminals may have a larger thickness than the electrode terminals of the other battery cells.

In this case, when the outermost electrode terminals are compared with the other electrode terminals, a structure in which the outermost electrode terminals have the same width as the other electrode terminals and a larger thickness than the other electrode terminals or a structure in which the outermost electrode terminals have a larger width and a larger thickness than the other electrode terminals may be considered. The former structure is more preferable.

In a case in which the outermost electrode terminals connected to the external input and output terminals, among the electrode terminals of the battery cells, are thicker than the electrode terminals of the other battery cells as described above, it is possible to improve reliability and safety of the battery module and, in addition, to easily weld the electrode terminals.

Meanwhile, the outermost electrode terminals may be coupled to, for example, bus bars connected to the external input and output terminals.

In a case in which the thickness of the outermost electrode terminals directly connected to the bus bars is greater than that of the electrode terminals of the other battery cells, therefore, it is possible to reinforce structural weakness of the battery module.

Each of the bus bars may be formed of copper plated with nickel with the result that the bus bars may be easily welded to the outermost electrode terminals.

In a concrete example, the thickness of the outermost electrode terminals may be 120% to 300% that of the electrode terminals of the other battery cells. Specifically, if the thickness of the outermost electrode terminals is less than 120% that of the electrode terminals of the other battery cells, it is difficult to prevent the outermost electrode terminals from being broken, which is not preferable. On the other hand, if the thickness of the outermost electrode terminals is greater than 300% that of the electrode terminals of the other battery cells, weldability between the outermost electrode terminals and the bus bars is lowered, which is not preferable.

More preferably, the thickness of the outermost electrode terminals is 150% to 250% that of the electrode terminals of the other battery cells.

The electrode terminals of each of the battery cells may include a cathode terminal formed of aluminum and an anode terminal formed of copper plated with nickel. Preferably, the cathode terminal may have a larger thickness than the anode terminal.

In a case in which the thickness of the cathode terminal formed of aluminum is greater than that of the anode terminal formed of copper plated with nickel, therefore, it is possible to reinforce weakness of the material.

In a concrete example, Table 1 below shows mechanical characteristics of the cathode terminal and the anode terminal per material. As can be seen from Table 1, the cathode terminal formed of aluminum has lower tensile strength than the anode terminal formed of copper.

TABLE 1

Difference in tensile strength based on materials for electrode leads of battery cell

| | Material | Method | Details |
|---|---|---|---|
| Cathode terminal | Material | JIS H 4170 | ALN90H-0 Aluminum |
| | Tensile strength | JIS Z 2241 | $\geq 40$ N/mm$^2$ $\leq 110$ N/mm$^2$ |
| Anode terminal | Material | JIS H 3100 | C1020R-O Copper (plated with nickel) |
| | Tensile strength | JIS Z 2241 | $\geq 195$ N/mm$^2$ |

In the battery module according to the present invention, on the other hand, the thickness of the cathode terminal having lower strength than the anode terminal is greater than that of the anode terminal. Consequently, it is possible to prevent welded portions between the cathode terminals and the bus bars from being broken even when external force, such as impact or vibration, is generated.

That is, among the electrode terminals of the battery cells, the cathode terminals having lower strength in material than the anode terminals formed of copper are thicker than the anode terminals. Consequently, it is possible to minimize breakage of connection portions between the cathode terminals and the bus bars due to external force.

Meanwhile, a cathode terminal of the outermost electrode terminals may have a larger thickness than an anode terminal of the outermost electrode terminals.

In a concrete example of the above structure, the thickness of the cathode terminal of the outermost electrode terminals may be 0.3 to 0.5 mm and the thickness of the anode terminal of the outermost electrode terminals may be 0.1 to 0.3 mm within a range less than that of the cathode terminal.

Specifically, if the thickness of the cathode terminal is less than 0.3 mm, it is not possible to retain desired strength of the cathode terminal, which is not preferable. On the other hand, if the thickness of the cathode terminal is greater than 0.5 mm, weldability between the cathode terminal and the corresponding bus bar is lowered, which is not preferable.

In the same manner, if the thickness of the anode terminal is less than 0.1 mm, it is not possible to retain desired strength of the anode terminal, which is not preferable. On the other hand, if the thickness of the anode terminal is greater than 0.3 mm, weldability between the anode terminal and the corresponding bus bar is lowered, which is not preferable.

In another preferred example in which the electrode terminals have different vertical sectional areas, the outermost electrode terminals may have a larger width than the other electrode terminals.

In the above structure, the width of the outermost electrode terminals may be 130% to 200% that of the electrode terminals of the other battery cells.

In the battery module having the above structure, the width of the outermost electrode terminals connected to the external input and output terminals of the battery module, among the electrode terminals of the battery cells, is greater than that of the electrode terminals of the other battery cells, thereby improving reliability and safety of the battery module.

In the present invention, each of the plate-shaped battery cells is a secondary battery having a small thickness and a relatively large width and length so as to minimize the overall size of the battery module when the battery cells are stacked to constitute the battery module.

A preferred example of the secondary battery may be a secondary battery configured to have a structure in which an electrode assembly of a cathode/separator/anode structure is mounted in a battery case formed of a laminate sheet including a resin layer and a metal layer and a cathode terminal and an anode terminal protrude from opposite ends of the battery case. Specifically, the electrode assembly may be mounted in a pouch-shaped battery case formed of an aluminum laminate sheet. The secondary battery having the above structure may be referred to as a 'pouch-shaped battery cell.'

Preferably, each of the cell units is configured to have a structure in which the battery cells are mounted in metal housings in a state in which the battery cells are in tight contact with each other. The metal housings may be coupled to fully cover an outside of a battery cell stack, including outsides of the two or more battery cells, excluding the cathode terminals and the anode terminals.

In an example, each of the metal housings may have an inner structure corresponding to an external shape of the battery cell stack and the metal housings may be coupled to each other by assembly and fastening.

In another example, sectional coupling portions of the metal housings may be configured to have a male and female fastening structure in which, when the metal housings are pushed to each other in a state in which the metal housings are in contact with each other so as to face each other, the metal housings are engaged with each other by elastic coupling.

Meanwhile, a secondary battery generates heat during charge and discharge of the secondary battery. It is important to effectively discharge the generated heat from the secondary battery in order to increase the lifespan of the secondary battery. For this reason, each of the metal housings may be formed of a metal sheet such that heat generated by the battery cells in the metal housings is more easily discharged from the metal housings.

As previously described, each of the cell units is configured to have a structure in which the two or more battery cells are mounted in the metal housings in a state in which the battery cells are connected to each other in series. Preferably, each of the cell units includes two battery cells.

In a preferred example, series connection between the cell units may be achieved by bending a tip of an electrode terminal of a first cell unit and a tip of an electrode terminal of a second cell unit in the shape of 'ㄱ' when viewed in section and welding overlapping portions thereof.

Meanwhile, a middle or large-sized battery pack is manufactured using a plurality of battery cells to provide high output and large capacity. It is necessary for battery modules constituting the battery pack to exhibit higher installation efficiency, structural stability, and heat dissipation efficiency in order to secure safety of the battery pack in a limited installation space.

In accordance with another aspect of the present invention, therefore, there is provided a middle or large-sized battery pack manufactured by combining two or more battery modules based on desired output and capacity.

A middle or large-sized battery system according to the present invention may be manufactured by combining battery packs based on desired output and capacity. The middle or large-sized battery system may be used in an electric vehicle, a hybrid electric vehicle, or a plug-in hybrid electric vehicle, which has a limited installation space and is exposed to frequent vibration and strong impact in consideration of installation efficiency and structural stability as described above.

Effects of the Invention

As is apparent from the above description, the battery module according to the present invention is configured such that the electrode terminals of the outermost battery cells of the cell units have a larger vertical sectional area than the electrode terminals of the other battery cells, thereby securing connection reliability between the electrode leads even when external force, such as impact or vibration, is applied to the battery module.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
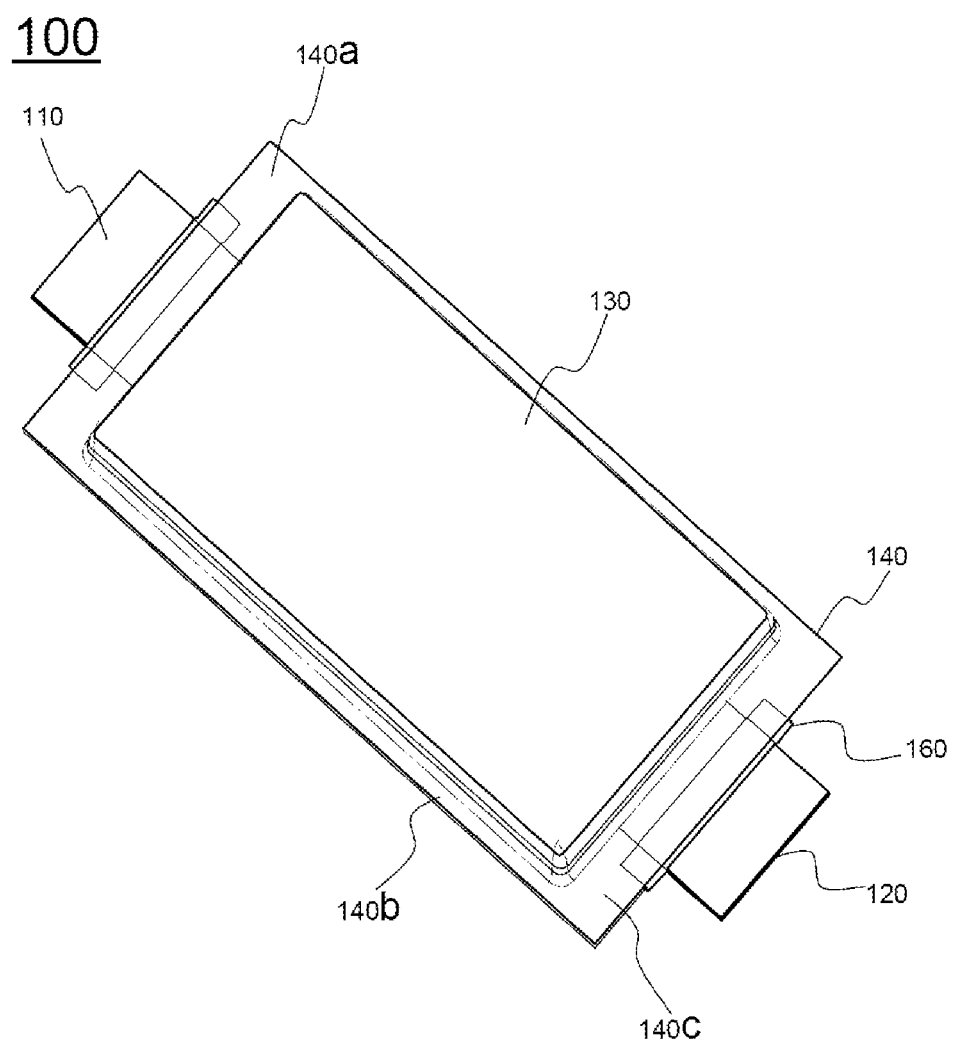
FIG. 1 is a perspective view showing a pouch-shaped battery.

FIG. 1 is a perspective view typically showing a pouch-shaped battery. Referring to FIG. 1, a pouch-shaped battery 100 is configured to have a structure in which a cathode terminal 110 and an anode terminal 120 protrude from the upper end and the lower end of a battery body 130, respectively, in a state in which the cathode terminal 110 and the anode terminal 120 are opposite to each other. A battery case 140 is a two-unit member including upper and lower battery cases. In a state in which an electrode assembly (not shown) is mounted in a receiving part which is defined between the upper and lower battery cases, opposite sides 140b, upper ends 140a, and lower ends 140c, which are contact regions, of the upper and lower battery cases, are bonded to each other, whereby the battery cell 100 is manufactured. The battery case 140 is configured to have a laminate structure of a resin layer/metal foil layer/resin layer. Consequently, it is possible to bond the opposite sides 140b, the upper ends 140a, and the lower ends 140c of the upper and lower battery cases, which are in contact with each other, to each other by applying heat and pressure to the opposite sides 140b, the upper ends 140a, and the lower ends 140c of the upper and lower battery cases so as to weld the resin layers thereof to each other. According to circumstances, the opposite sides 140b, the upper ends 140a, and the lower ends 140c of the upper and lower battery cases may be bonded to each other using a bonding agent.

For the opposite sides 140b of the battery case 140, the same resin layers of the upper and lower battery cases are in direct contact with each other, whereby uniform sealing at the opposite sides 140b of the battery case 140 is accomplished by welding. For the upper ends 140a and the lower ends 140c of the battery case 140, on the other hand, the cathode terminal 110 and the anode terminal 120 protrude from the upper ends 140a and the lower ends 140c of the battery case 140, respectively. For this reason, the upper ends 56 and the lower ends 57 of the upper and lower battery cases are thermally welded to each other, in a state in which a film type sealing member 160 is interposed between the electrode terminals 110 and 120 and the battery case 140, in consideration of the thickness of the electrode terminals 110 and 120 and the difference in material between the electrode terminals 110 and 120 and the battery case 140, so as to increase sealability of the battery case 140.

Figure 2:
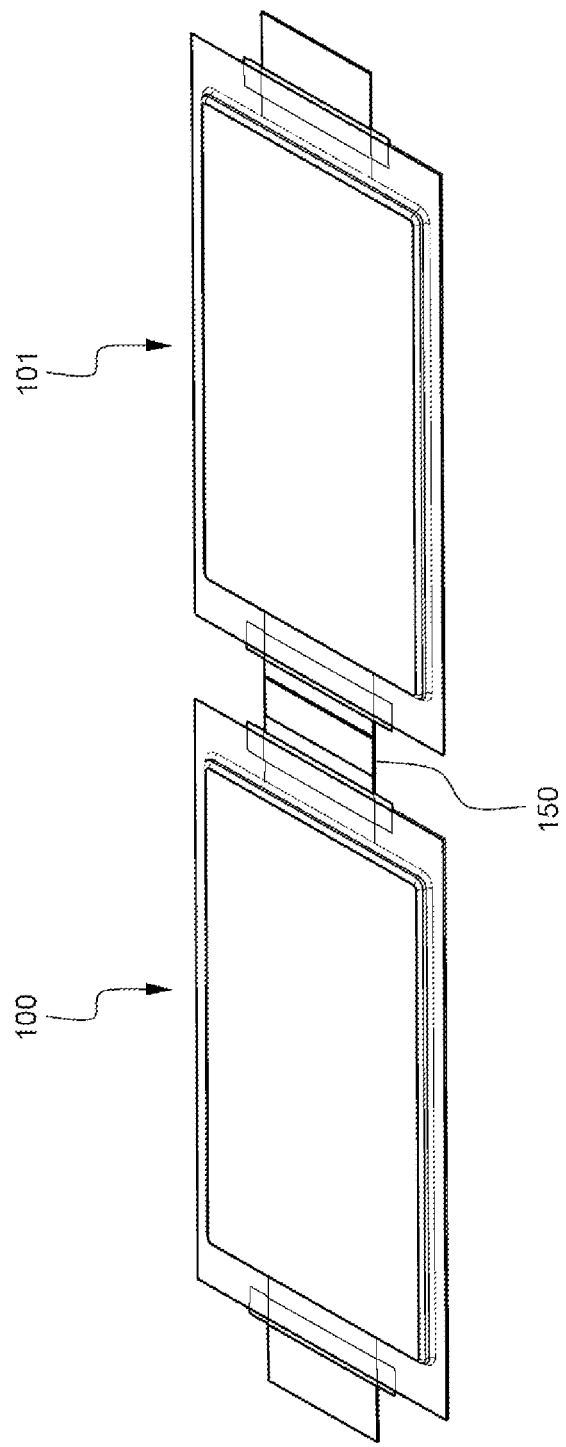
FIGS. 2 and 3 are perspective views showing battery cells in which two pouch-shaped batteries, one of which is shown in FIG. 1, are connected to each other in series.
Figure 3:
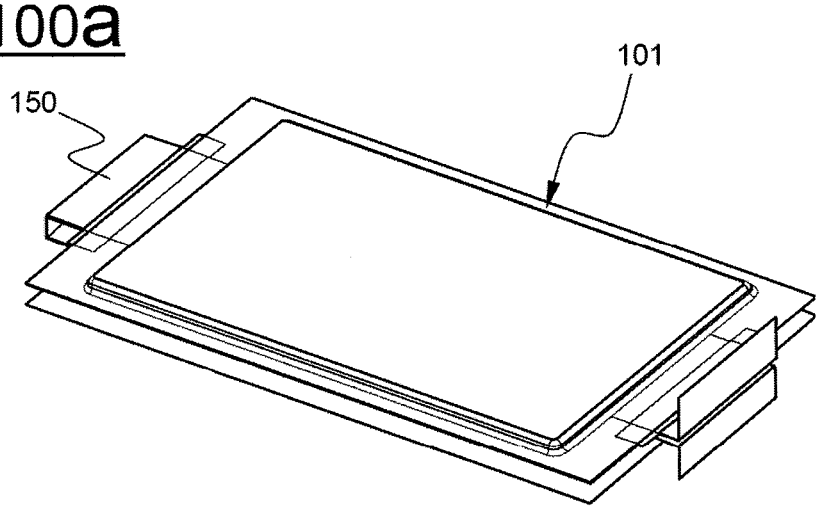

FIGS. 2 and 3 are perspective views typically showing battery cells in which two pouch-shaped batteries, one of which is shown in FIG. 1, are connected to each other in series.

Referring to these drawings together with FIG. 1, in a state in which two pouch-shaped battery cells 100 and 101 is arranged in series in the longitudinal direction such that electrode terminals 110 and 120 of the pouch-shaped battery cells 100 and 101 are successively adjacent to each other, the electrode terminals 110 and 120 of the pouch-shaped battery cells 100 and 101 are welded to each other and then the pouch-shaped battery cells 100 and 101 are folded such that the pouch-shaped battery cells 100 and 101 overlap each other. In FIG. 3, an electrode terminal connection portion 150, at which the electrode terminals 110 and 120 are coupled by welding, of a battery cell stack 100a constituted by the folded pouch-shaped battery cells 100 and 101 is bent in a bracket shape when viewed on plan.

Figure 4:
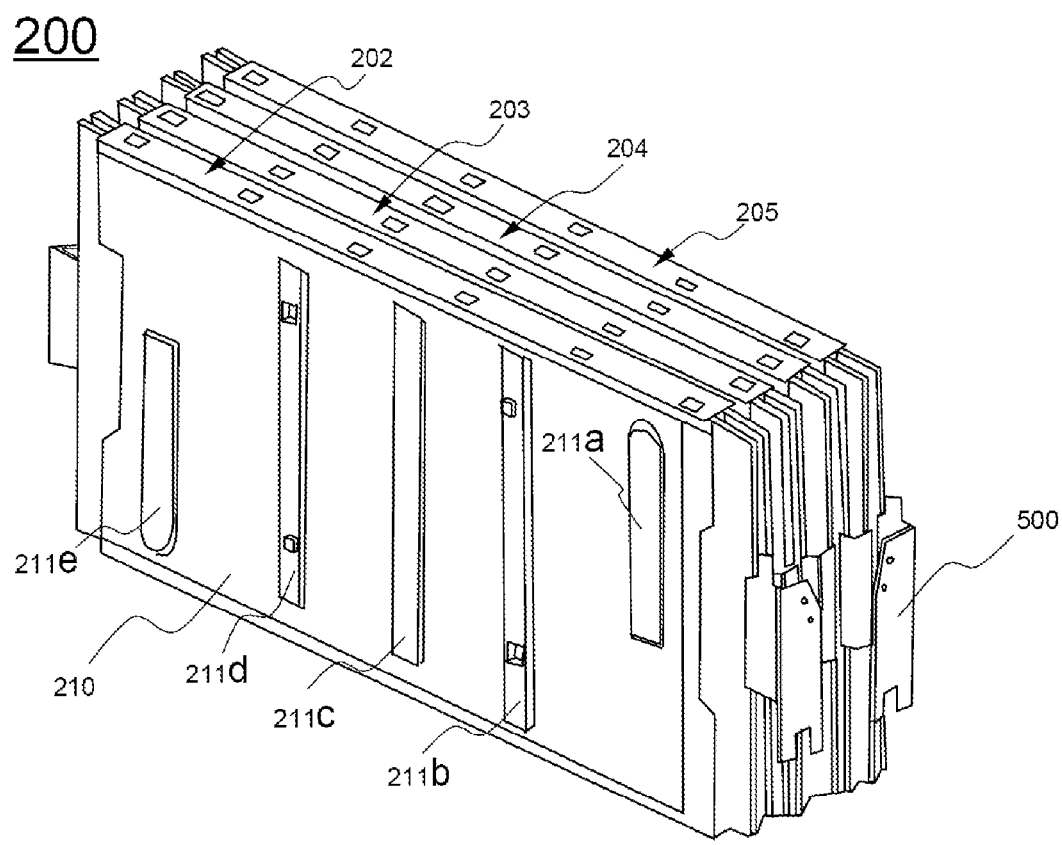
FIG. 4 is a perspective view showing a cell unit stack according to an embodiment of the present invention.
Figure 5:
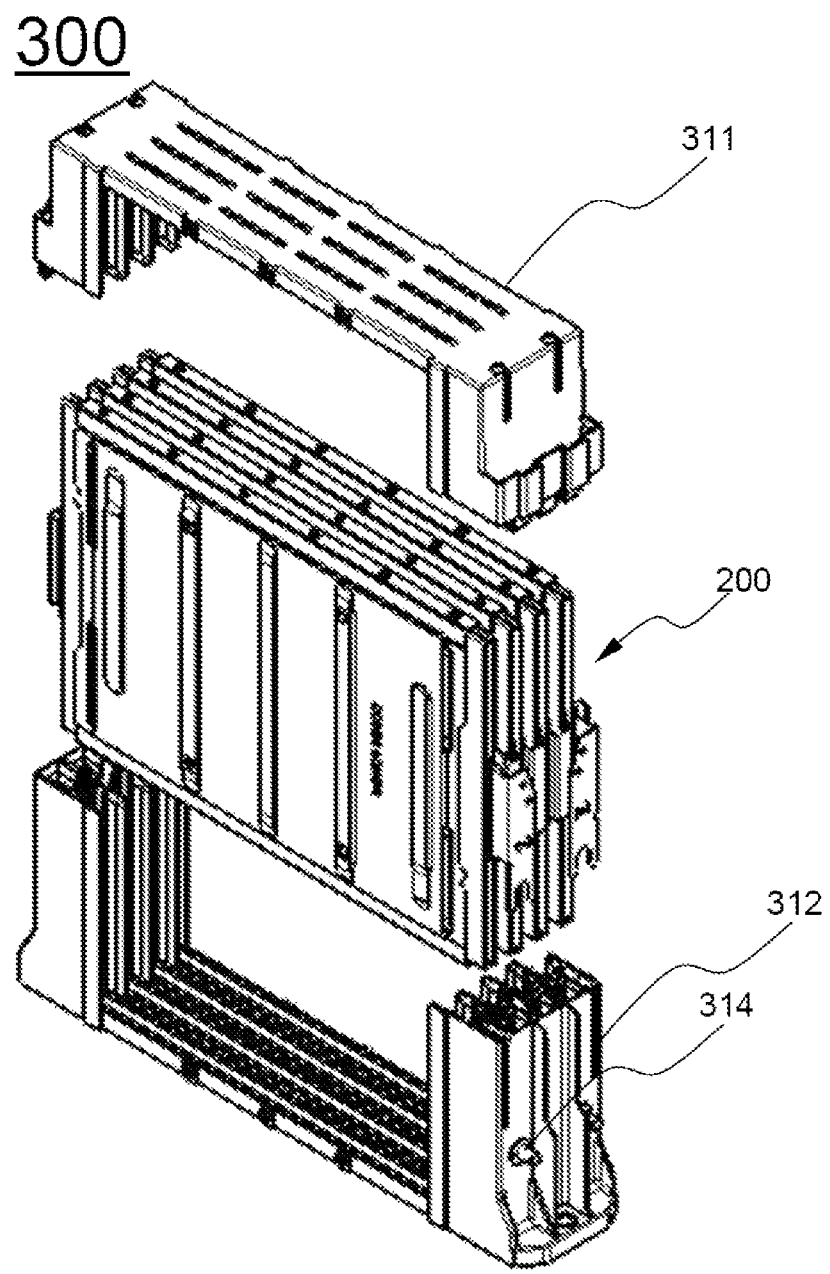
FIG. 5 is an exploded perspective view showing a battery module according to another embodiment of the present invention.

FIG. 4 is a perspective view typically showing a cell unit stack according to an embodiment of the present invention and FIG. 5 is an exploded perspective view typically showing a battery module according to another embodiment of the present invention.

Referring to these drawings, a battery module 300 is configured to have a structure in which a cell unit stack 200, which is constituted by connecting four hexahedral cell units 202, 203, 204, and 205 to one another in series in a state in which the hexahedral cell units 202, 203, 204, and 205 are stacked, is mounted to an upper case 311 and a lower case 312, which are vertically assembled to each other, in a state in which the cell unit stack 200 is erected on the side. External input and output terminals 314 are mounted at the front of the lower case 312.

The cell unit stack 200 is configured to have a structure in which the four hexahedral cell units 202, 203, 204, and 205, each of which includes battery cells covered by metal housings 210, are stacked in zigzags in a state in which the cell units 202, 203, 204, and 205 are connected to one another in series.

Meanwhile, linear protrusions 211a, 211b, 211c, 211d, and 211e are formed at the outside of each of the metal housings 210 in a state in which the linear protrusions 211a, 211b, 211c, 211d, and 211e are spaced apart from one another in the longitudinal direction. The linear protrusions 211a and 211e, which are shorter than each of the metal housings 210 in the lateral direction, are formed at opposite ends of each of the metal housings 210 such that the linear protrusions 211a and 211e disposed diagonally to each other.

Figure 6:
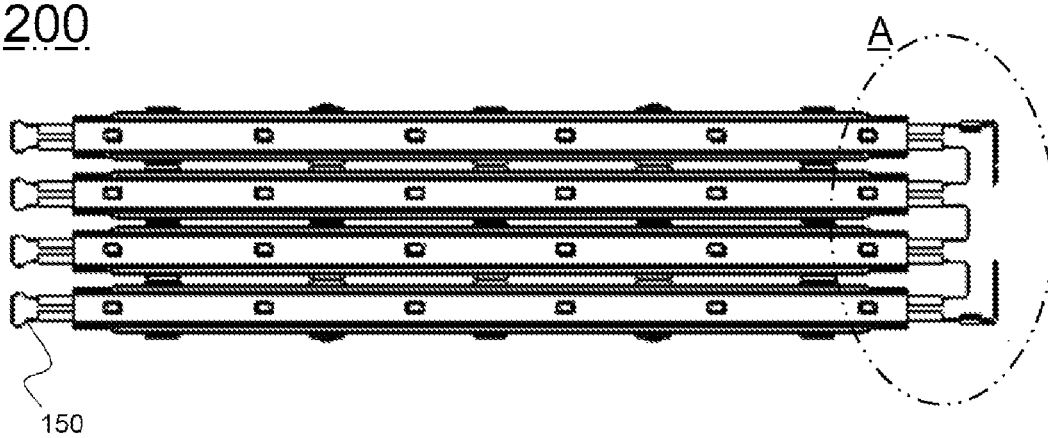
FIG. 6 is a plan view of the cell unit stack shown in FIG. 4.
Figure 7:
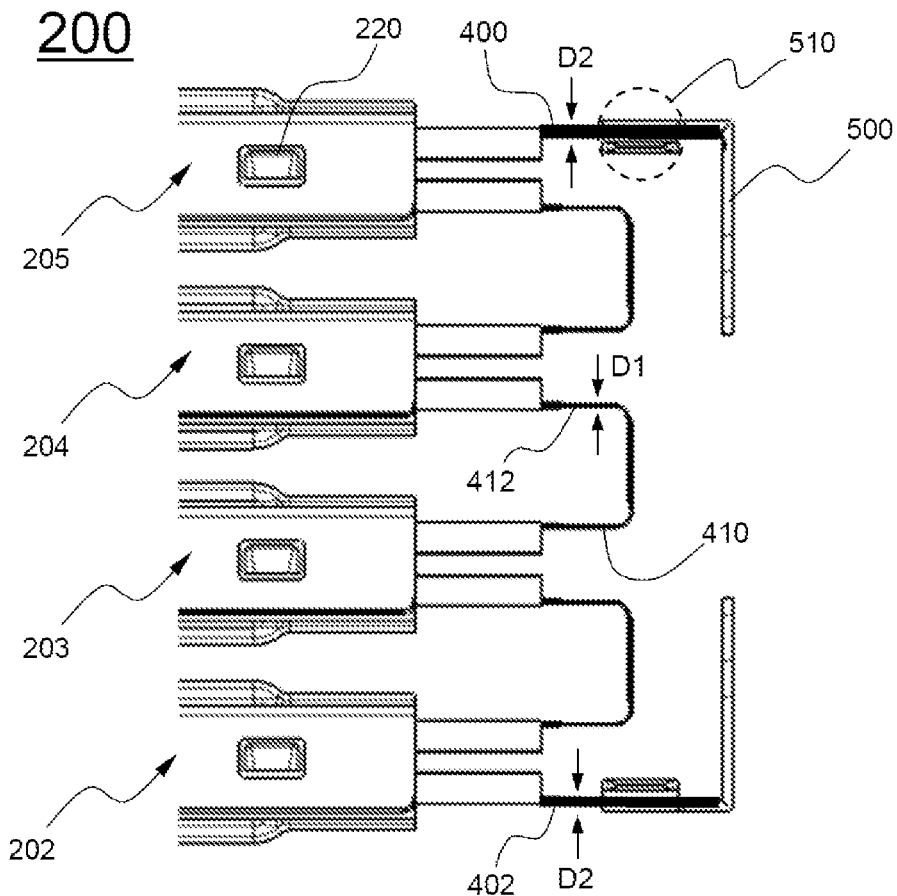
FIG. 7 is a partially enlarged view showing a portion A of FIG. 6.

FIG. 6 is a plan view typically showing the cell unit stack of FIG. 4 and FIG. 7 is a partially enlarged view typically showing a portion A of FIG. 6.

Referring to these drawings together with FIGS. 4 and 5, the outermost electrode terminals 400 and 402 of the outermost battery cells of the cell units 202, 203, 204, and 205 have a larger thickness than electrode terminals 410 and 412 of the other battery cells such that the outermost electrode terminals 400 and 402 may be prevented from being broken by external force.

Specifically, a thickness D2 of the outermost electrode terminals 400 and 402 is greater than a thickness D1 of the electrode terminals 410 and 412 of the other battery cells. That is, the electrode terminals 400, 402, 410, and 412 have the same width. On the other hand, the electrode terminals 400, 402, 410, and 412 have different thicknesses (D1>D2). Consequently, a vertical sectional area of the electrode terminals 400 and 402 is greater than that of the electrode terminals 410 and 412.

The outermost electrode terminals 400 and 402 are coupled to but bars 500 connected to the respective external input and output terminals 314 of the battery module by welding. The thickness of the outermost electrode terminals 400 and 402 is 200% or more that of the electrode terminals of the other battery cells.

In a concrete example, the thickness of a cathode terminal of the outermost electrode terminals is 0.4 mm and the thickness of an anode terminal of the outermost electrode terminals is 0.2 mm within a range less than that of the cathode terminal.

The electrode terminals of each of the battery cells includes a cathode terminal 410 formed of aluminum and an anode terminal 412 formed of copper plated with nickel. Each of the bus bars 500 is formed of copper plated with nickel.

Each of the cell units 202, 203, 204, and 205 is configured to have a structure in which battery cells are mounted in the metal housings 210 in a state in which the battery cells are in tight contact with each other. The metal housings 210 are coupled to fully cover the outside of the battery cell stack, including outsides of the two or more battery cells, excluding the cathode terminals and the anode terminals.

In addition, each of the metal housings 210 is formed of a metal sheet. Each of the metal housings 210 has an inner structure corresponding to an external shape of the battery cell stack. The metal housings 210 are coupled to each other by assembly and fastening. Sectional coupling portions of the metal housings 210 are configured to have a male and female fastening structure 220. When the metal housings 210 are pushed to each other in a state in which the metal housings 210 are in contact with each other so as to face each other, therefore, the metal housings 210 are engaged with each other by elastic coupling.

Series connection among the cell units 202, 203, 204, and 205 is achieved by bending the tip of the electrode terminal 412 of the first cell unit 204 and the tip of the electrode terminal 410 of the second cell unit 203 in the shape of '⌐' when viewed in section and welding the overlapping portions thereof.

Figure 8:
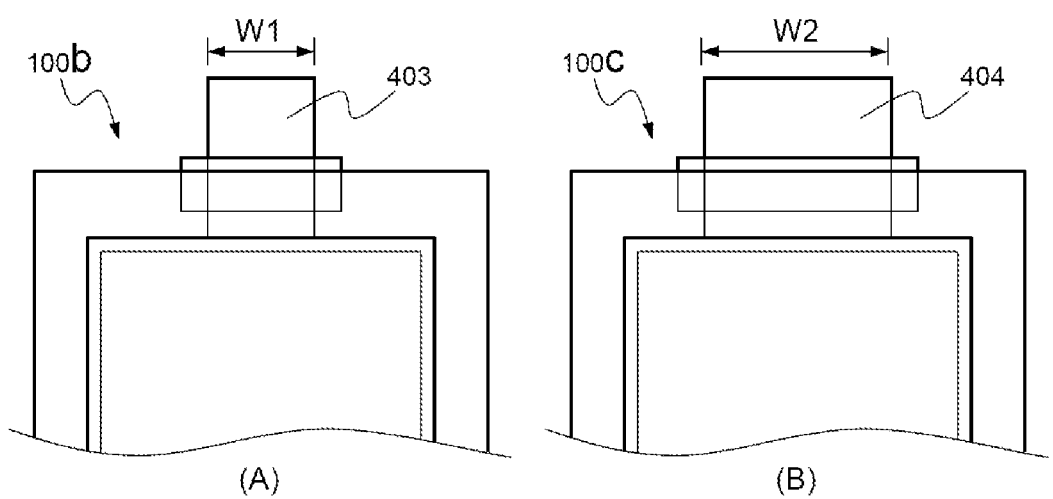
FIG. 8 is a partially detailed view showing electrode terminals of a cell unit according to a further embodiment of the present invention.

FIG. 8 is a partially detailed view showing electrode terminals of a cell unit according to a further embodiment of the present invention.

Referring to FIG. 8, battery cells 100b and 100c constituting the cell unit includes electrode terminals 403 and 404 having widths W1 and W2, respectively.

Specifically, the width W2 of the electrode terminal 404 of the battery cell 100c constituting the outmost electrode terminal is 130% to 200% the width W1 of the electrode terminal 403 of the battery cell 100b. That is, the electrode terminal 404 of the battery cell 100c and the electrode terminal 403 of the battery cell 100b have the same thickness but different widths (W2>W1). Consequently, the electrode terminal 404 of the battery cell 100c has a larger vertical section al area that the electrode terminal 403 of the battery cell 100b.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery module comprising a plurality of plate-shaped battery cells which are sequentially stacked, wherein
the battery module is configured to have a structure in which two or more hexahedral cell units are connected to each other in series in a state in which the hexahedral cell units are stacked,
each of the cell units is configured to have a structure in which two or more battery cells are connected to each other in series in a state in which the battery cells are in tight contact with each other,
electrode terminals (outermost electrode terminals) of outmost battery cells of the cell units are connected to external input and output terminals of the battery module, the outermost electrode terminals having a larger thickness than electrode terminals of the other battery cells such that the outermost electrode terminals are prevented from being broken by external force,
the outermost electrode terminals are coupled to bus bars connected to the external input and output terminals,
series connection between the cell units is configured to have a structure in which a tip of the electrode terminal of a first cell unit and a tip of the electrode terminal of a second cell unit are bent in the shape of '⌐' when viewed in section and overlapping portions thereof are welded,
each of the battery cells are pouch-shaped battery cells having a case, the electrode terminals of each battery cell extending outside the case,
the electrode terminals of each of the battery cells comprises a cathode terminal formed of aluminum and an anode terminal formed of copper plated with nickel, and
a cathode terminal of the outermost electrode terminals has a larger thickness than an anode terminal of the outermost electrode terminals.

2. The battery module according to claim 1, wherein thickness of the outermost electrode terminals is 120% to 300% that of the electrode terminals of the other battery cells.

3. The battery module according to claim 1, wherein the thickness of the cathode terminal of the outermost electrode terminals is 0.3 to 0.5 mm and the thickness of the anode terminal of the outermost electrode terminals is 0.1 to 0.3 mm within a range less than that of the cathode terminal.

4. The battery module according to claim 1, wherein the outermost electrode terminals have a larger width than the electrode terminals of the other battery cells.

5. The battery module according to claim 4, wherein the width of the outermost electrode terminals is 130% to 200% that of the electrode terminals of the other battery cells.

6. The battery module according to claim 1, wherein each of the bus bars is formed of copper plated with nickel.

7. The battery module according to claim 1, wherein each of the cell units is configured to have a structure in which the battery cells are mounted in metal housings in a state in which the battery cells are in tight contact with each other.

8. The battery module according to claim 7, wherein the metal housings are coupled to fully cover an outside of a battery cell stack, including outsides of the two or more battery cells; excluding cathode terminals and anode terminals.

9. The battery module according to claim 8, wherein each of the metal housings has an inner structure corresponding to an external shape of the battery cell stack, and the metal housings are coupled to each other by assembly and fastening.

10. The battery module according to claim 8, wherein sectional coupling portions of the metal housings are configured to have a male and female fastening structure in which, when the metal housings are pushed to each other in a state in which the metal housings are in contact with each other so as to face each other, the metal housings are engaged with each other by elastic coupling.

11. The battery module according to claim 7, wherein each of the metal housings is formed of a metal sheet.

12. The battery module according to claim 1, wherein each of the cell units is configured to have a structure in which two battery cells are connected to each other in series.

13. A battery pack of high output and large capacity comprising two or more battery modules according to claim 1 based on output and capacity.

14. The battery pack according to claim 13, wherein the battery pack is used as a power source for any one of an electric vehicle, a hybrid electric vehicle, or a plug-in hybrid electric vehicle.

15. The battery module according to claim 1, wherein each of the plate-shaped battery cells is configured to have a structure in which an electrode assembly of a cathode/separator/anode structure is mounted in a battery case formed of a laminate sheet comprising a resin layer and a metal layer, and the cathode terminal and the anode terminal protrude from opposite ends of the battery case.

* * * * *